(12) United States Patent
Saad

(10) Patent No.: US 7,865,619 B2
(45) Date of Patent: Jan. 4, 2011

(54) METHOD AND APPARATUS FOR BUILDING CENTRALIZED MIDDLEWARE

(75) Inventor: Rashad Saad, Chula Vista, CA (US)

(73) Assignee: Intuit Inc., Mountain View, CA (US)

(\*) Notice: Subject to any disclaimer, the term of this patent is extended or adjusted under 35 U.S.C. 154(b) by 1110 days.

(21) Appl. No.: 11/540,256

(22) Filed: Sep. 29, 2006

(65) Prior Publication Data

US 2008/0082689 A1 Apr. 3, 2008

(51) Int. Cl.
*G06F 15/16* (2006.01)

(52) U.S. Cl. .............. 709/246; 709/223; 709/224; 709/217; 709/218; 709/236; 709/219; 370/352; 370/471; 370/353; 370/354; 370/229; 370/230; 370/235; 370/236; 370/252

(58) Field of Classification Search ........... 709/246, 709/225, 223, 224, 217, 218, 236, 219
See application file for complete search history.

(56) References Cited

U.S. PATENT DOCUMENTS 7,324,531 B2\* 1/2008 Cho ................... 370/401
2007/0282846 A1\* 12/2007 Goodwill et al. ........ 707/10

\* cited by examiner

*Primary Examiner*—Jude J Jean Gilles
(74) *Attorney, Agent, or Firm*—Park, Vaughan, Fleming & Dowler LLP

(57) ABSTRACT

One embodiment of the present invention provides a system that uses middleware to transmit data from a first system to a second system. During operation, centralized middleware receives a request from a user to transmit the data from the first system to the second system, wherein the centralized middleware comprises a set of middleware agents which interact with the user on behalf of a set of associated middleware. Upon receiving the request, the centralized middleware uses a middleware agent to transform the data from a first data format associated with the first system to a second data format associated with the second system. The centralized middleware then sends the transformed data to the second system. In this way, the centralized middleware hides the technical details of how the data is manipulated from the user.

17 Claims, 6 Drawing Sheets

ENTERPRISE SYSTEM 100

METHOD AND APPARATUS FOR BUILDING CENTRALIZED MIDDLEWARE

BACKGROUND

Related Art

Many business enterprises are built around systems that perform specific processes. For example, the information processing infrastructure for a business may include an order system, an accounting system, a manufacturing system, and a shipping system. To enable these different systems to exchange information, many businesses employ human data analysts to process data received from different source systems. More specifically, these data analysts extract information received from different source systems and possibly transform the extracted data into different formats before feeding the data to one or more downstream systems.

However, the systems which comprise a particular enterprise architecture are often heterogeneous. For example, the systems may execute on different operating systems, which prevents them from communicating with each other without using a data interpreter. One solution to this problem is to use middleware (e.g., CORBA or MQSeries) to parse and transform data which is communicated between the different systems. For example, some complex enterprise architectures use different types of middleware to interconnect different types of systems. Furthermore, the introduction of a new data format or a change in the data needs of a downstream system may require existing middleware to be modified or may require new middleware modules to be developed.

Unfortunately, it is difficult for non-technical data analysts to deal with enterprise data in such heterogeneous environments without knowing the technical requirements for each type of middleware. Moreover, even if such data analysts are trained to use existing types of middleware, it is impractical to retrain them each time changes are made to existing middleware modules or when new types of middleware are added to the enterprise system.

SUMMARY

One embodiment of the present invention provides a system that uses middleware to transmit data from a first system to a second system. During operation, centralized middleware receives a request from a user to transmit the data from the first system to the second system, wherein the centralized middleware comprises a set of middleware agents which interact with the user on behalf of a set of associated middleware. Upon receiving the request, the centralized middleware uses a middleware agent to transform the data from a first data format associated with the first system to a second data format associated with the second system. The centralized middleware then sends the transformed data to the second system. In this way, the centralized middleware hides the technical details of how the data is manipulated from the user.

In a variation on this embodiment, the user communicates with the centralized middleware through a graphical user interface.

In a variation on this embodiment, the centralized middleware uses a set of rules which specify how the data is transformed between different data formats associated with different systems.

In a variation on this embodiment, the middleware agent encapsulates functionality of the middleware.

In a variation on this embodiment, prior to transforming the data, the middleware agent parses the data into associated data elements.

In a further variation on this embodiment, the centralized middleware transforms the data by: determining the first data format; determining the second data format; identifying rules which specify how to transform the first data format into the second data format; and transforming the data based on the identified rules using the middleware agent.

In a variation on this embodiment, when new middleware is introduced, the centralized middleware can be expanded to include new middleware agent and new transformation rules.

In a variation on this embodiment, the centralized middleware is implemented using extensible markup language (XML).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Communicating Data Through a Middleware

Figure 1:
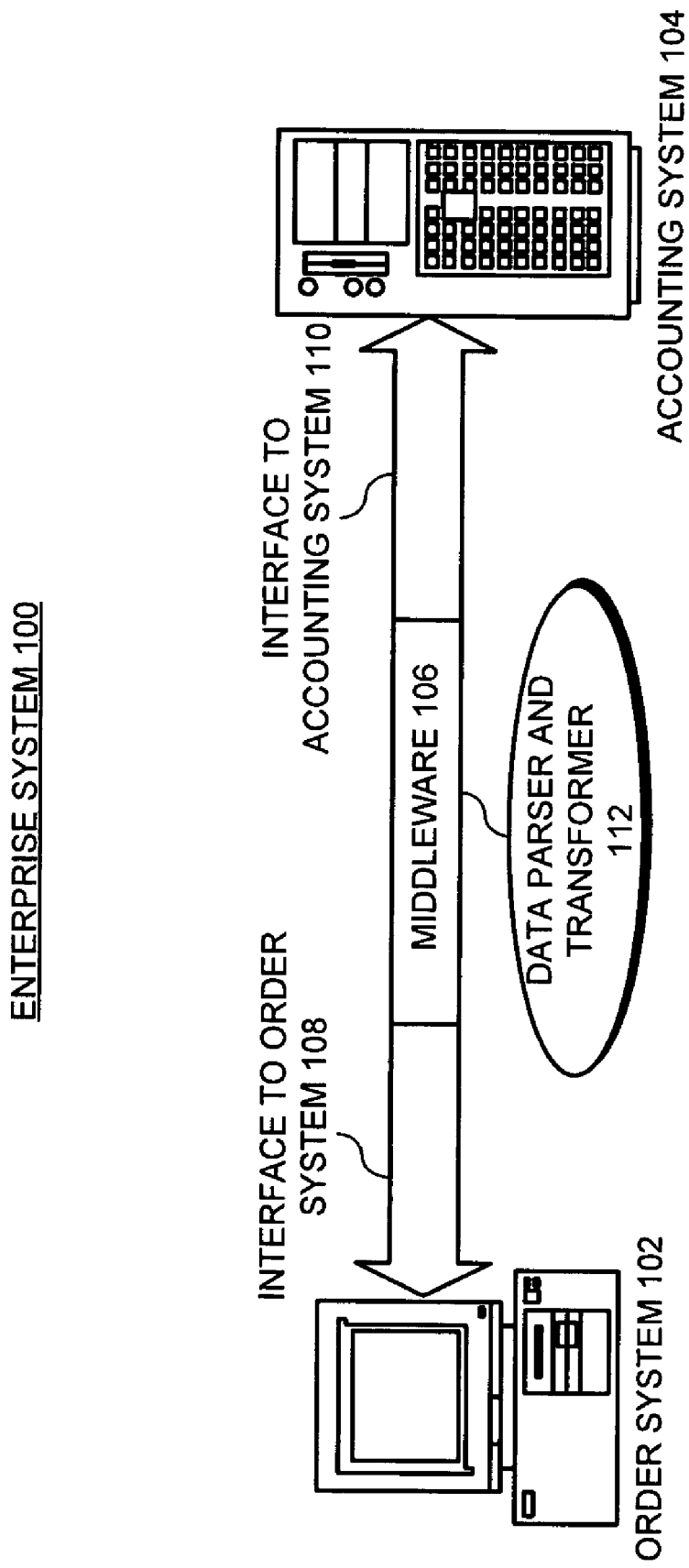
FIG. 1 illustrates an enterprise system 100 which includes two computer systems that communicate data through middleware in accordance with an embodiment of the present invention.

FIG. 1 illustrates an enterprise system 100 which includes two computer systems that communicate data through middleware in accordance with an embodiment of the present invention.

As illustrated in FIG. 1, enterprise system 100 includes an order system 102 which communicates with an accounting system 104 through middleware 106, wherein middleware 106 provides an interface between order system 102 and accounting system 104, which allows the two systems to communicate with each other.

More specifically, middleware 106 comprises an interface 108 which couples order system 102 with middleware 106, an interface 110 which couples accounting system 104 with middleware 106. It also includes a data parser and transformer module 112, which translates the data flowing between the two systems. Note that both interfaces 108 and 110 can send and receive data to and from the associated systems.

In one embodiment of the present invention, middleware 106 receives order information (e.g., customer name, address) from order system 102 through interface 108, wherein order information is specified in a data format that is incompatible with the data requirement of accounting system 104. Next, data-parser-and-transformer 112 translates the order information into a data format which is compatible with accounting system 104. The system then transmits the transformed order information to accounting system 104 through interface 110. In this example, data-parser-and-transformer 112 is specifically configured to enable order system 102 and accounting system 104 to communicate with each other.

Communicating Data Between Multiple Middleware

Figure 2:
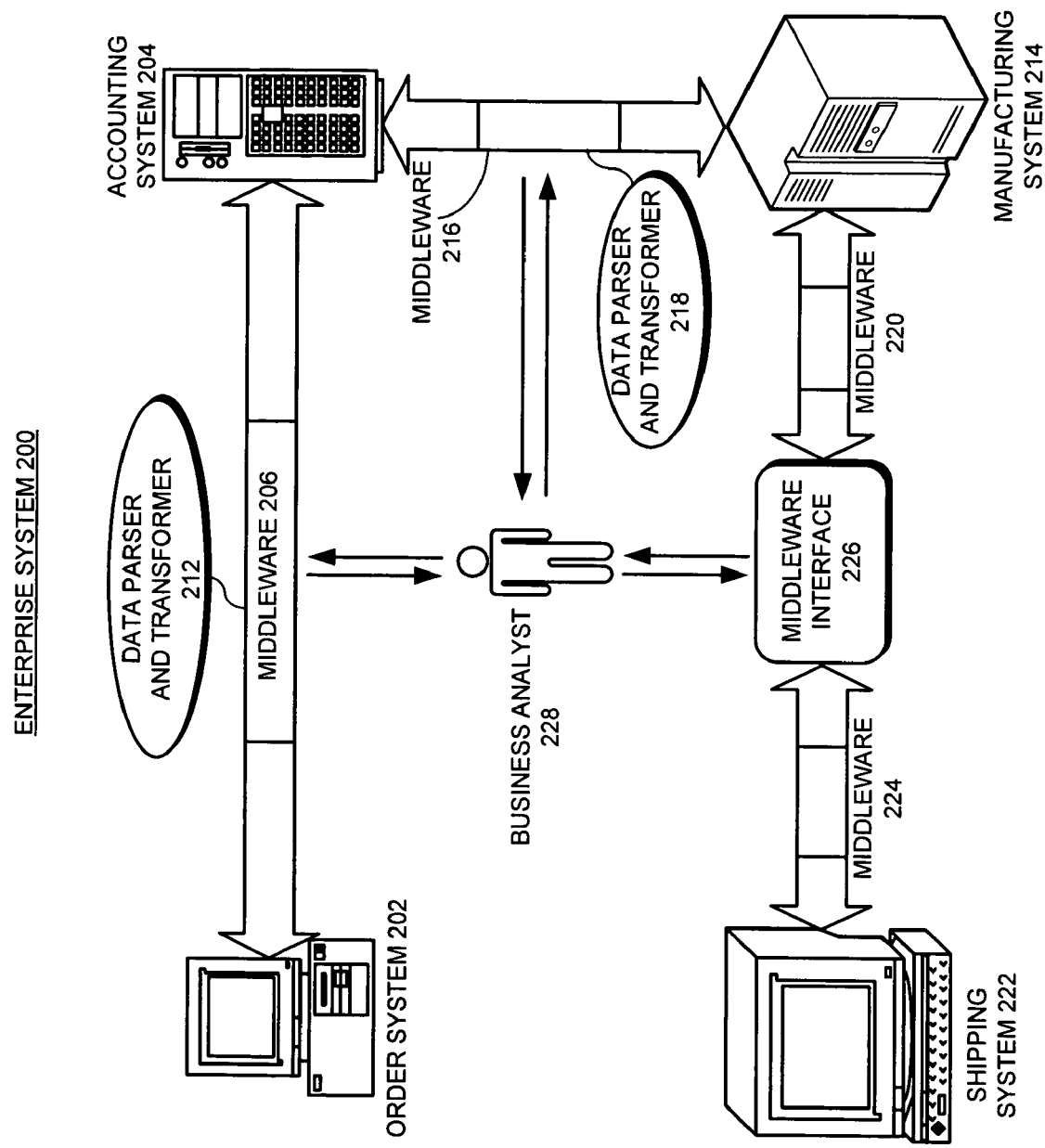
FIG. 2 illustrates an enterprise system 200 which comprises multiple systems that interact with each other through multiple middleware interfaces in accordance with an embodiment of the present invention.

FIG. 2 illustrates an enterprise system 200 which comprises multiple systems that interact with each other through multiple middleware interfaces in accordance with an embodiment of the present invention.

Enterprise system 200 includes all the components of enterprise system 100 (illustrated in FIG. 1) and additionally includes a manufacturing system 214 which communicates directly with accounting system 204. Note that because manufacturing system 214 operates on a different platform from both order system 202 and accounting system 204, new middleware 216 is introduced to facilitate the communication between accounting system 204 and manufacturing 214.

Middleware 216 includes a data-parser-and-transformer module 218 which translates data flowing between accounting system 204 and manufacturing 214. Also note that manufacturing system 214 utilizes second middleware module 220 to communicate with systems other than accounting system 204. These types of middleware used in enterprise system 200 can be written using different types of code, which can include, but are not limited to, MQSeries, CORBA, J2EE, Businessware; and .NET.

Enterprise system 200 additionally includes a shipping system 222, which communicates with other systems through middleware 224. Note that middleware 224 and middleware 216 do not communicate with each other directly. To facilitate communication between manufacturing system 214 and shipping system 222, a middleware interface 226 is created in-between middleware 220 and middleware 224. Data received from manufacturing system 214 at middleware 220 is first transformed into an intermediate data format at middleware interface 226. Next, the intermediate data format is transformed by middleware 224 into a data format which is compatible with shipping system 222.

Note that enterprise system 200 operates within a heterogeneous computing environment. Hence, business analyst 228 who receives data from one of the systems is responsible for extracting information from the received data, converting the extracted data into specific format, and then routing the data into one or more destination systems. For example, business analyst 228 first receives order information from order system 202. Next, business analyst 228 verifies the order information and subsequently routes some or all of order information to other systems, including accounting system 204 to generate billing information and manufacturing system 214 to generate a manufacture request.

For business analyst 228 to be able to interact with multiple heterogeneous systems in enterprise system 200, it is necessary for business analyst 228 to interact with each system through its associated middleware. For example, after processing order information for accounting system 204, business analyst 228 routes the data to accounting system 204 by sending the data to middleware 206, which transforms the data into a data format which is compatible with accounting system 204. Such communication between business analyst 228 and middleware requires business analyst 228 to know technical details of the middleware. Moreover, if a new system is later added into enterprise system 200, business analyst 228 has to learn technical features of the new system as well.

Communicating Data Through a Centralized Middleware

Figure 3:
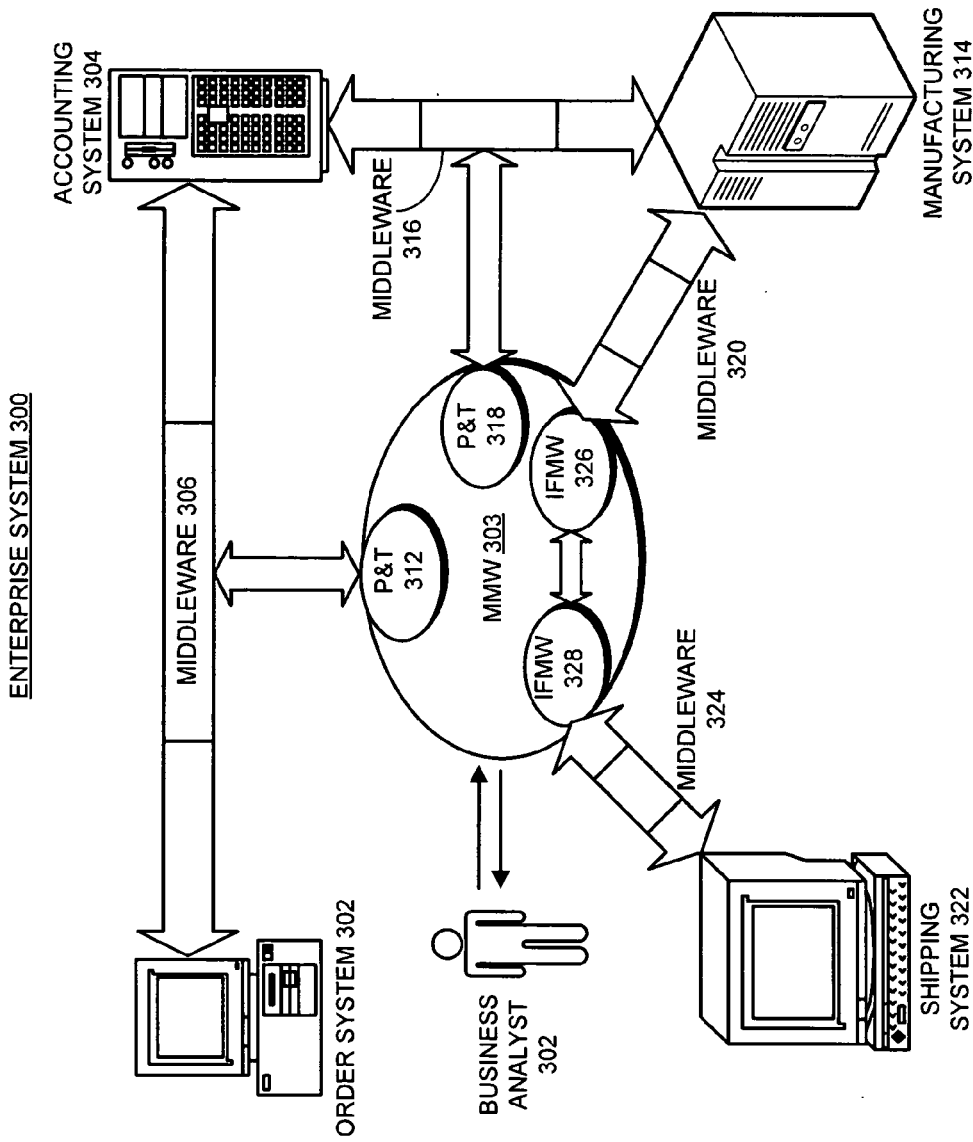
FIG. 3 illustrates an enterprise system wherein multiple systems interact with each other through an integrated middleware interface in accordance with an embodiment of the present invention.

FIG. 3 illustrates an enterprise system 300 wherein multiple systems interact with each other through an integrated middleware interface in accordance with an embodiment of the present invention.

Enterprise system 300 includes all the systems and components that exist in enterprise system 200 in FIG. 2. However, all the interface components of different middleware modules are aggregated into a single interface, wherein the interface components include data-parser-and-transformer 212 in FIG. 2, data-parser-and-transformer 218 in FIG. 2, and middleware interface 226 in FIG. 2. This interface serves as the hub between the middleware, and also facilitates communication with business analyst 302. We refer to this integrated interface as "meta middleware," or MMW hereafter.

Note that in enterprise system 300, business analyst 302 does not have to interact with each system and associated middleware directly. Instead, business analyst 302 only interacts with MMW 303, which serves as a single agent for all of the middleware components in enterprise system 300. Specifically, MMW 303 integrates a set of agents, wherein each agent is mapped to a particular middleware module by encapsulating its parameters, functionality, and attributes. For example, P&T 312 is the agent for data-parser-and-transformer 212 in FIG. 2 and P&T 318 is the data-parser-and-transformer 218 in FIG. 2.

These agents within MMW 303 can be graphically represented and presented to business analyst 302 through a user interface (UI) as a communication channel to the multiple systems while hiding all of the communication details between the agents and the various systems. The generic nature of MMW 303 allows business analyst 302 to configure and manipulate the data without the need for technical programming.

One of the properties of MMW is that parameters of a specific middleware module are populated from the middleware module to an associated agent during the installation of MMW to allow the agent to communicate with the middleware module. For example, communicating with MQSeries queues will require populating parameters, such as the queue manager name and the queue name to a MQSeries agent within MMW. As illustrated in FIG. 3, middleware interface agent IFMW 326 encapsulates parameters of middleware 320, while middleware interface agent IFMW 328 encapsulates parameters of middleware 324. Note that the communication between middleware 320 and middleware 324 is enabled through IFMW 326 and IFMW 328. Typically, the encapsulated parameters will not be changed unless the enterprise system is reconfigured.

Another property of MMW is that MMW provides the enterprise with a generic parser and transformer, which comprises a number of parser agents for multiple middleware modules. For example, agent P&T 312 encapsulates the functionality of the data-parser-and-transformer for middleware 306, and P&T 318 encapsulates the functionality of the data-parser-and-transformer for middleware 316. In one embodiment of the present invention, when user data associated with a specific system enters MMW, the generic parser and transformer breaks down the data into atomic data elements. Such atomic data elements are subsequently used to create new data format based on the business analyst's specification.

Yet another property of MMW is that it is expandable to include new middleware interfaces and new parsing and transformation rules when new middleware or a new client system is introduced. When new middleware is introduced into the enterprise, new agents will be deployed into the MMW. However, introducing new agents into the MMW requires that the MMW to be re-initialized so that the updates can be installed.

Note that MMW isolates a business savvy user who lacks technical background from: (1) the nature of the data and how it is being manipulated and parsed; and (2) the middleware that is interconnecting the systems between which the data is flowing.

Interfacing a Business User and an MMW

Figure 4:
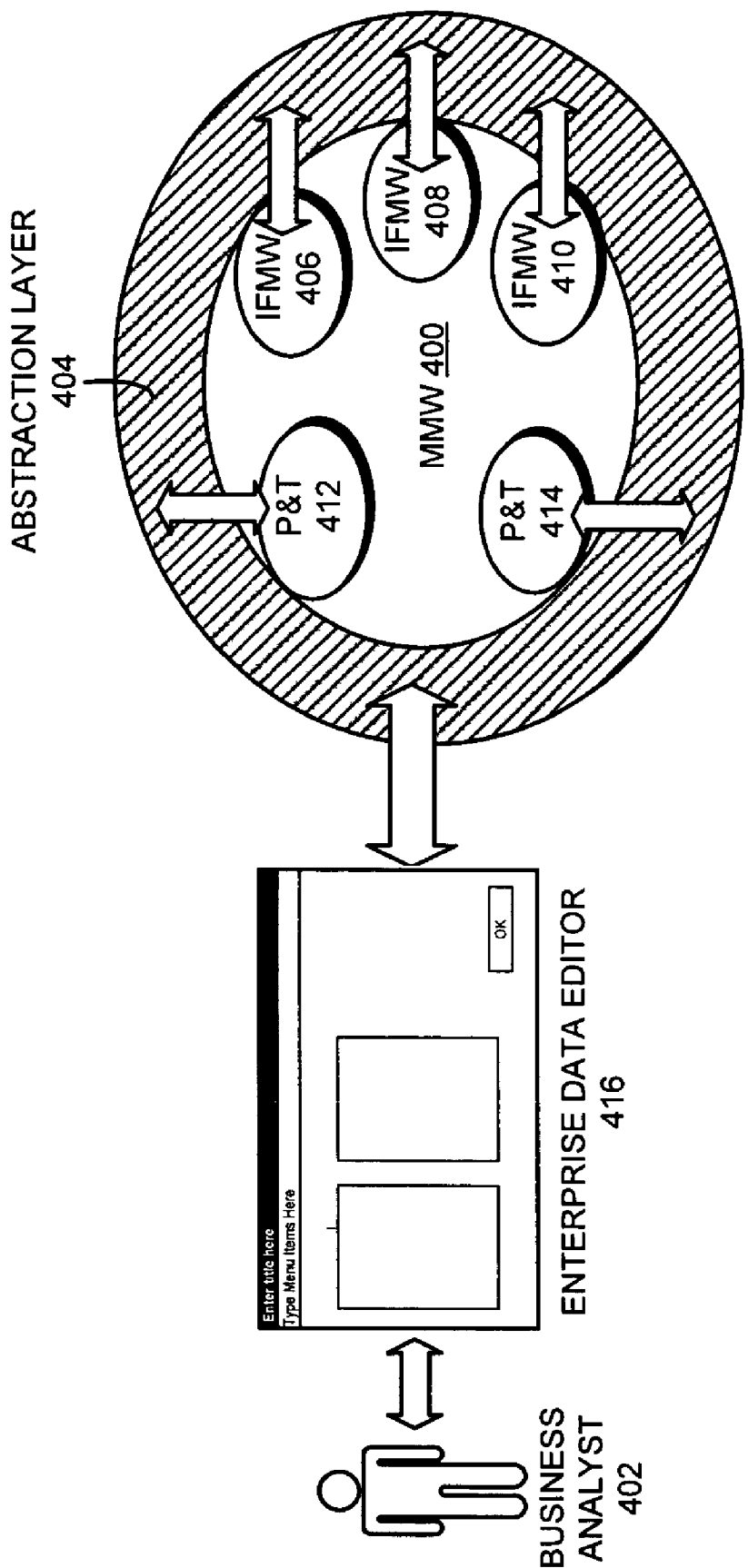
FIG. 4 illustrates how a business analyst interacts with meta-middleware (MMW) in accordance with an embodiment of the present invention.

FIG. 4 illustrates how a business analyst 402 interacts with MMW 400 in accordance with an embodiment of the present invention.

As illustrated in FIG. 4, business analyst 402 communicates with MMW 400 through an abstraction layer 404. Abstraction layer 404 is part of the MMW 400 which hides technical details of the functional implementation and changes to the inner core of MMW 400 from business analyst 402. Furthermore, agents within MMW 400, including middleware interface agents IFMW 406-410 and data-parser-and-transformer agents P&T 412-414, also communicate with each other through abstraction layer 404, which also specifies how these agents are related. More specifically, abstraction layer 404 provides a common language which is understood and used by the agents to talk to each other.

Through abstraction layer 404, MMW 400 can graphically display the enterprise in terms of systems. For example, MMW 400 can display: the data that a system needs; the hosts the system runs on; and the conditions upon which the system should receive the data. MMW 400 can encapsulate technical details, for example, by displaying host name rather than IP address. In one embodiment of the present invention, abstraction layer 404 presents to business analyst 402 an enterprise data editor 416 through a user interface, wherein enterprise data editor 416 allows business analyst 402 to manipulate data graphically without programming.

By using enterprise data editor 416, business analyst 402 can interact with MMW 400 to configure data based on the needs of each downstream system and to match the downstream system with appropriate middleware parameters. For example, business analyst 402 can define new data types or create new data formats by combining atomic data elements through command entered into enterprise data editor 416. Business analyst 402 can then use enterprise data editor 416 to route the data to a specific instance of a system by defining the host name and the presence or absence of certain data.

In one embodiment of the present invention, abstraction layer 404 is implemented using an extensible markup language (XML) repository, wherein XML is a common language through which the components of MMW 400 communicate each other. In particular, XML repository comprises a rule database which specifies translations between different data formats associated with different systems. Moreover, XML repository includes rules which allow new data types to be created, and also allows new rules to be added.

More specifically, the XML repository interacts with business analyst 402 through enterprise data editor 416, which allows business analyst 402 to define new data types and new data formats by combining atomic enterprise data elements. For example, business analyst 402 can declare a new data type called "Customer Full Name," and can subsequently define a data format for Customer Full Name as a combination of two atomic data elements: "Customer First name"+"Customer Last name." This new data format definition can then be received by the XML repository and translated into rules specified in XML, and these rules can be added to the XML repository.

By using enterprise data editor 416, business analyst 402 can also specify a "data profile" for an application. For example, business analyst 402 can define an application called "accounting" and can then associate the application with two data types: "Customer Full Name" and "Zip Code." For each newly defined application, business analyst 402 can associate a communication method with the application by specifying one or more middleware types for the application. For example, business analyst 402 can specify both MQSeries and CORBA for the application accounting.

Finally through enterprise data editor 416, business analyst 402 can initiate a data communication process by designating one application as the sender and another application as the receiver.

Figure 5:
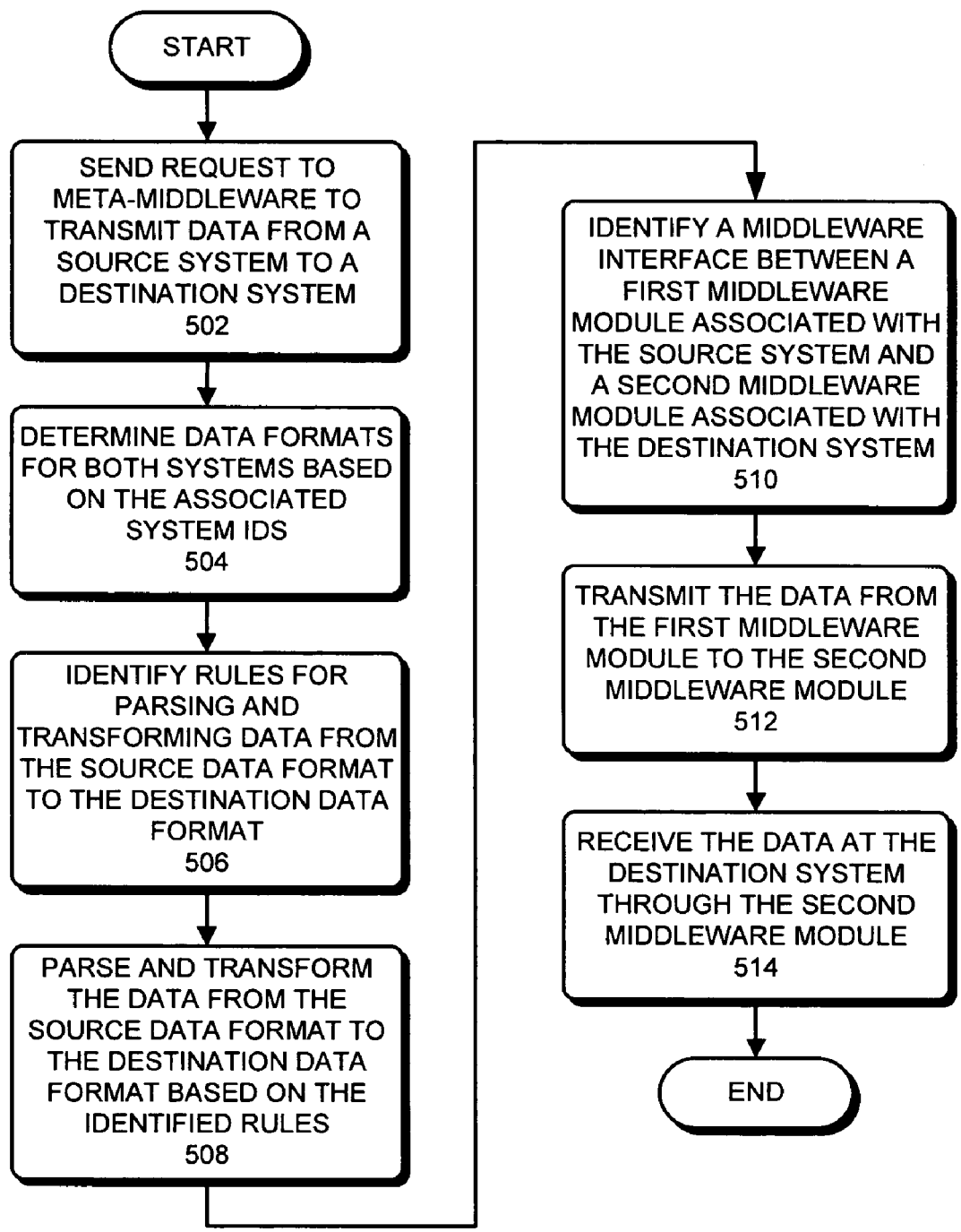
FIG. 5 presents a flowchart illustrating the process of transmitting data from a source system to a destination system in accordance with an embodiment of the present invention.

FIG. 5 presents a flowchart illustrating the process of transmitting data from a source system to a destination system in accordance with an embodiment of the present invention.

During this data transmitting process, a business analyst sends a request to MMW to transmit data from the source system to the destination system (step 502). In one embodiment of the present invention, the business analyst enters the request into an enterprise data editor provided by MMW, wherein the request specifies a source ID for the source system and a destination ID for the destination system. The request additionally specifies a first middleware module associated with the source system and a second middleware module associated with the second system.

Next, the MMW determines the data format of the source system based on the source ID and data format of the destination system based on the destination ID (step 504). The MMW then identifies rules in a rule database which specify how to parse and transform the data from the source data format into the destination data format (step 506). The MMW then parses and transforms the data based on the identified rules (step 508).

Next, the MMW identifies a middleware interface which facilitates data transmission between the first middleware module and the second middleware module (step 510). The MMW then transmits the transformed data through the identified interface from the first middleware module to the second middleware module (step 512). Finally, the transformed data is received by the destination system through the second middleware module (step 514). Note that although the above process is described in the context of the sending and receiving systems using different middleware modules, the general process can also be applied in situations where the first middleware module and the second middleware module are identical. In these situations, steps 510 and 512 are simply skipped.

Computer System

Figure 6:
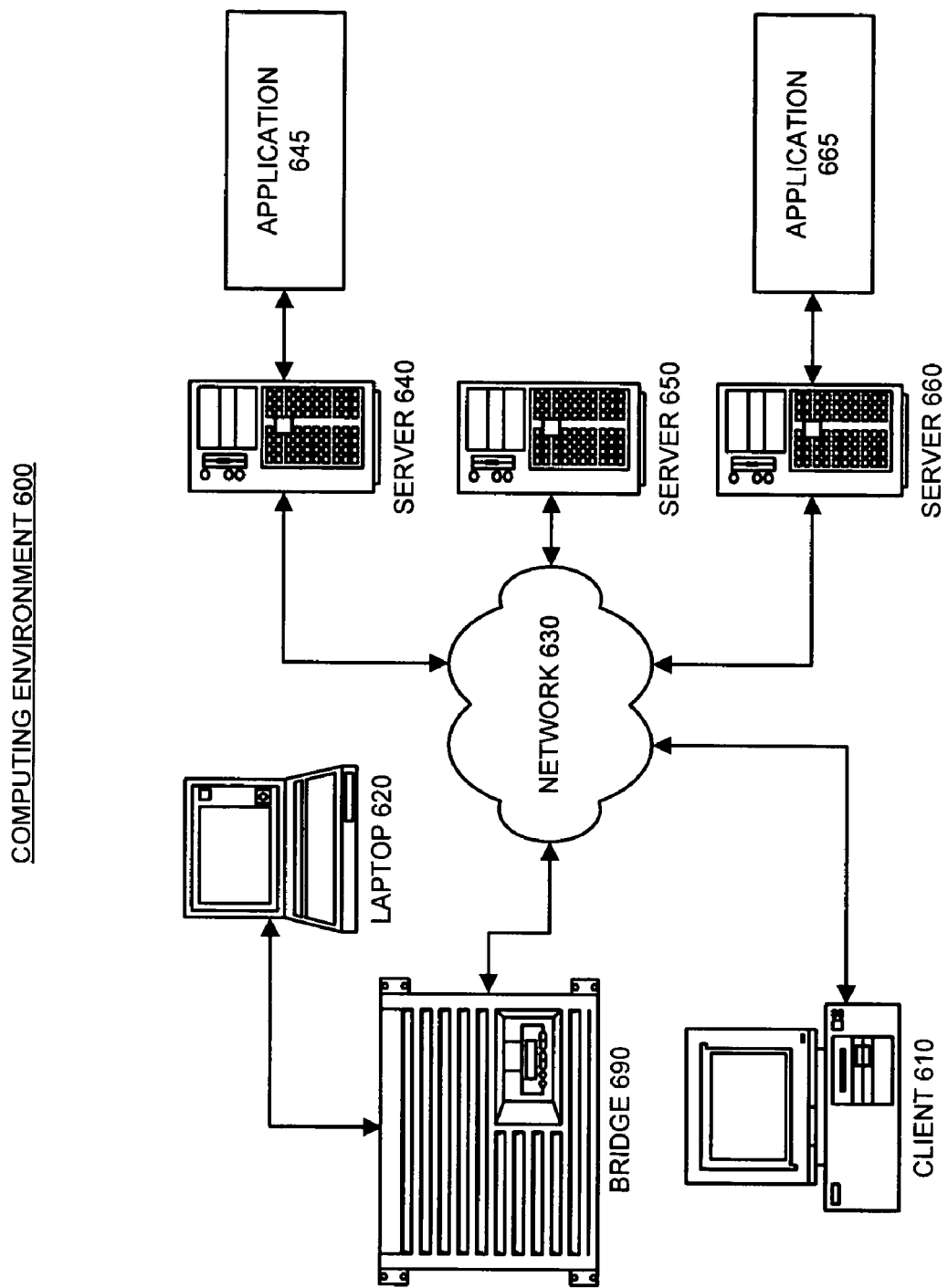
FIG. 6 illustrates a computing environment in accordance with an embodiment of the present invention.

FIG. 6 illustrates a computing environment 600 in accordance with an embodiment of the present invention.

Computing environment 600 can generally include any type of computer system, such as a computer system based on a microprocessor, a mainframe computer, a digital signal processor, a portable computing device, a personal organizer, a device controller, and a computational engine within an appliance. Specifically as is illustrated in FIG. 6, computing environment 600 can include client 610, laptop 620, network 630, server 640, server 650, server 660, application 645, application 665, and bridge 690.

Client 610 and laptop 620 can generally include any node on a network including computational capability and including a mechanism for communicating across the network.

Network 630 can generally include any type of wired or wireless communication channel capable of coupling together computing nodes. This includes, but is not limited to, a local area network, a wide area network, or a combination of networks. In one embodiment of the present invention, network 630 comprises the Internet.

Servers 640, 650, and 660 can generally include any nodes on a network which include a mechanism for servicing requests from a client for computational and/or data storage resources.

Applications 645 and 665 can generally include any computer program. In one embodiment of the present invention, server 640 executes application 645, and server 660 executes application 665.

In one embodiment of the present application, applications 645 and 665 are instances of the same application.

In one embodiment of the present application, applications 645 and 665 are instances of different applications.

In one embodiment of the present application, applications 645 and 665 are components of the same application.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using middleware to transmit data from a first system to a second system, the method comprising:
   receiving a request at a centralized middleware from a user to transmit the data from the first system to the second system, wherein the centralized middleware comprises a set of middleware agents which interact with the user on behalf of a set of associated middleware;
   using a middleware agent to transform the data from a first data format associated with the first system to a second data format associated with the second system, which comprises:
     parsing the data into associated data elements; and
     using the data elements to create the second data format; and
   sending the transformed data to the second system, whereby the centralized middleware hides technical details of how the data is manipulated from the user.

2. The method of claim 1, wherein the user communicates with the centralized middleware through a graphical user interface.

3. The method of claim 1, wherein the centralized middleware uses a set of rules specifying how the data is transformed between different data formats associated with different systems.

4. The method of claim 1, wherein the middleware agent encapsulates functionality of the associated middleware.

5. The method of claim 1, wherein parsing the data into the associated data elements involves using the middleware agent to parse the data.

6. The method of claim 3, wherein transforming the data involves:
   determining the first data format;
   determining the second data format;
   identifying rules which specify how to transform the first data format into the second data format; and
   transforming the data based on the identified rules using the middleware agent.

7. The method of claim 1, wherein the method further comprises expanding the centralized middleware to include a new middleware agent and new transformation rules when new middleware is introduced.

8. The method of claim 1, wherein the centralized middleware is implemented using an extensible markup language (XML).

9. A non-transitory computer-readable storage medium storing instructions that when executed by a computer cause the computer to perform a method for using middleware to transmit data from a first system to a second system, the method comprising:
   receiving a request at a centralized middleware from a user to transmit the data from the first system to the second system, wherein the centralized middleware comprises a set of middleware agents which interact with the user on behalf of a set of associated middleware;
   using a middleware agent to transform the data from a first data format associated with the first system to a second data format associated with the second system, which comprises:
     parsing the data into associated data elements; and
     using the data elements to create the second data format; and
   sending the transformed data to the second system, whereby the centralized middleware hides technical details of how the data is manipulated from the user.

10. The computer-readable storage medium of claim 9, wherein the user communicates with the centralized middleware through a graphical user interface.

11. The computer-readable storage medium of claim 9, wherein the centralized middleware uses a set of rules specifying how the data is transformed between different data formats associated with different systems.

12. The computer-readable storage medium of claim 9, wherein the middleware agent encapsulates functionality of the associated middleware.

13. The computer-readable storage medium of claim 9, wherein parsing the data into the associated data elements involves using the middleware agent to parse the data.

14. The computer-readable storage medium of claim 11, wherein transforming the data involves:
   determining the first data format;
   determining the second data format;
   identifying rules which specify how to transform the first data format into the second data format; and transforming the data based on the identified rules using the middleware agent.

15. The computer-readable storage medium of claim 9, wherein the method further comprises expanding the centralized middleware include a new middleware agent and new transformation rules when new middleware is introduced.

16. The computer-readable storage medium of claim 9, wherein the centralized middleware is implemented using an extensible markup language (XML).

17. An apparatus that uses middleware to transmit data from a first system to a second system, comprising:

a receiving mechanism configured to receive a request at a centralized middleware from a user to transmit the data from the first system to the second system, wherein the centralized middleware comprises a set of middleware agents which interact with the user on behalf of a set of associated middleware;

a transformation mechanism configured to use a middleware agent to transform the data from a first data format associated with the first system to a second data format associated with the second system, which comprises:
parsing the data into associated data elements; and
using the data elements to create the second data format; and a sending mechanism configured to send the transformed data to the second system, whereby the centralized middleware hides the technical details of how the data is manipulated from the user.

* * * * *